(12) United States Patent
Kjell et al.

(10) Patent No.: US 8,157,290 B2
(45) Date of Patent: Apr. 17, 2012

(54) INFLATABLE CURTAIN AIRBAG

(75) Inventors: Fredrik Kjell, Alingsås (SE); Andreas Jorlöv, Alingsås (SE); Henrik S. Johansson, Alingsås (SE)

(73) Assignee: Autoliv Development AB, Vargarda (SE)

( * ) Notice: Subject to any disclaimer, the term of this patent is extended or adjusted under 35 U.S.C. 154(b) by 106 days.

(21) Appl. No.: 12/678,386

(22) PCT Filed: Sep. 21, 2007

(86) PCT No.: PCT/EP2007/008243
§ 371 (c)(1),
(2), (4) Date: Mar. 16, 2010

(87) PCT Pub. No.: WO2009/036791
PCT Pub. Date: Mar. 26, 2009

(65) Prior Publication Data
US 2010/0194079 A1 Aug. 5, 2010

(51) Int. Cl.
*B60R 21/21* (2011.01)
*B60R 21/214* (2011.01)
(52) U.S. Cl. .................................................. 280/730.2
(58) Field of Classification Search ............... 280/728.1, 280/728.2, 730.2
See application file for complete search history.

(56) References Cited

U.S. PATENT DOCUMENTS

| | | | |
|---|---|---|---|
| 7,125,038 B2 | 10/2006 | Gammill | |
| 7,748,734 B2 | 7/2010 | Wilmot | |
| 2004/0021307 A1 * | 2/2004 | Ziolo et al. | 280/739 |
| 2004/0201207 A1 * | 10/2004 | Ochiai et al. | 280/730.2 |
| 2005/0057023 A1 * | 3/2005 | Burton et al. | 280/730.2 |
| 2007/0046007 A1 | 3/2007 | Zarazua | |
| 2010/0207369 A1 * | 8/2010 | Okimoto et al. | 280/741 |

FOREIGN PATENT DOCUMENTS

| | | |
|---|---|---|
| DE | 20 2006 006903 U1 | 9/2007 |
| DE | 202006006903 U1 * | 10/2007 |
| JP | 11-321532 * | 11/1999 |
| JP | 2004-224155 A | 8/2004 |

OTHER PUBLICATIONS

Strap Definition: Dictionary.Com,http://dictionary.reference.com/browse/strap?r=66.*
PCT/EP2007/008243—International Search Report—Mar. 26, 2009.

* cited by examiner

*Primary Examiner* — Joseph Rocca
(74) *Attorney, Agent, or Firm* — Brinks Hofer Gilson & Lione

(57) ABSTRACT

An Inflatable curtain airbag for a vehicle comprising an airbag body (1) rolled or folded to form a longitudinal airbag package with several attachment portions (6) and an indication element (2) for indicating a twisted attachment status of the airbag at the vehicle structure. The indication element (2) is arranged in a releasable manner along at least parts of the longitudinal extension of the package.

12 Claims, 3 Drawing Sheets

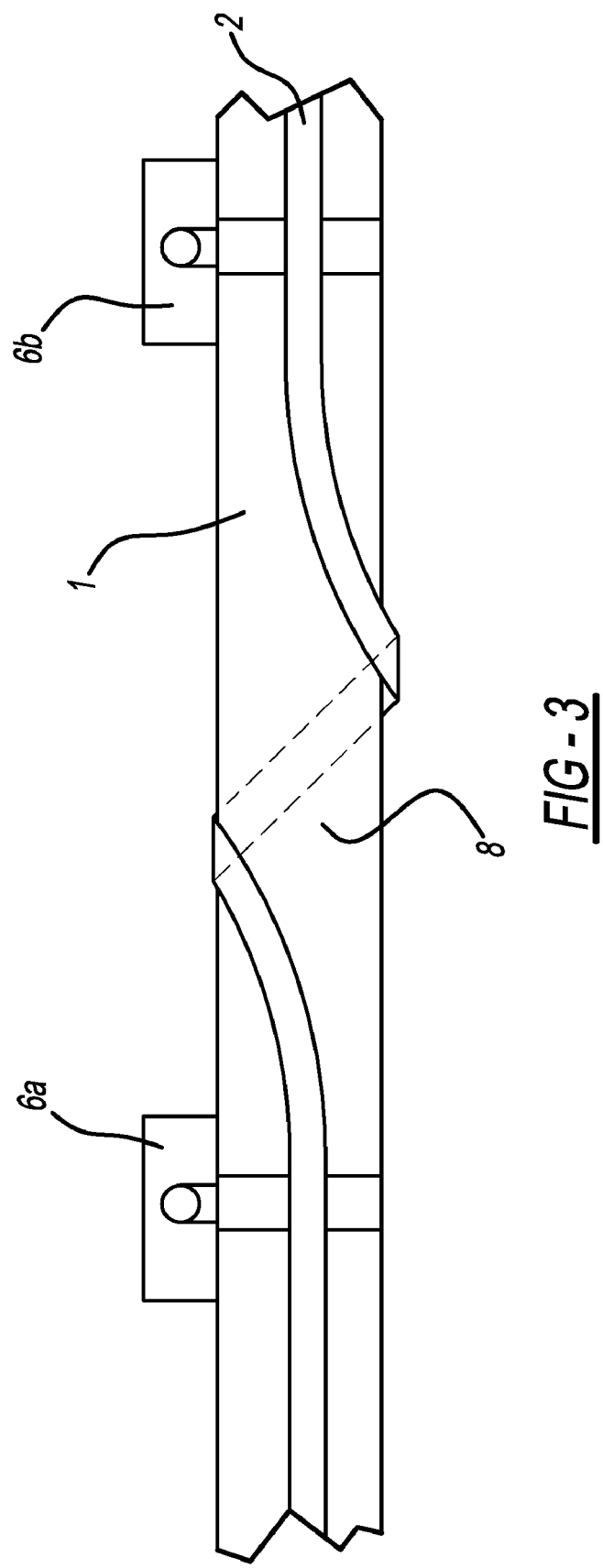

INFLATABLE CURTAIN AIRBAG

CROSS REFERENCE TO RELATED APPLICATION

This application claims priority to PCT patent application PCT/EP2007/008243 filed Sep. 21, 2007.

FIELD OF THE INVENTION

The invention concerns an inflatable curtain airbag with an inflator and an airbag body with several attachment portions along the length axis of the airbag.

BACKGROUND OF THE INVENTION

Inflatable curtain type airbags are used in general for the side impact protection of the occupant. The airbag covers in the inflated condition the inside of the side windows and part of the pillars of the occupant compartment. Therefore the airbag has a length of approximately or nearly the distance from the A to C or D-pillar, with several attachment portions.

Because of the length of the airbag, there is a risk that the airbag is mounted in a twisted status at the vehicle. If the airbag is attached in a twisted condition, the airbag will not be properly deployed during a crash, and does not cover the interior side structure of the car as needed in case of a side impact.

Therefore it was already proposed in the JP 2004-224255 to use an indication thread formed by weaving or sewing a thread of a colour different from the base cloth of the airbag body. When the airbag is folded regularly and attached untwisted, the indication thread extends in the longitudinal direction of the airbag body. So far it is possible to indicate a wrong twisted attachment by the indication thread, when it is extending in a shape of a spiral along the airbag.

Nevertheless the use of the indication thread is problematic, because the rather thin indication thread is hardly visible, especially when the operator needs to mount the airbag at the inside of the roof rim from the outside of the vehicle. In such a case it might be that the operator cannot see the indication thread or can only see a part of the indication thread. When the twisted attachment is not detected, the interior trim panel can be mounted afterwards without any problems.

SUMMARY OF THE INVENTION

Starting from this prior art, it is the object of the invention to reduce the risk of a twisted attachment of the airbag at the vehicle structure. According to the invention an indication element is arranged in a releasable manner at the outside of the airbag body along the length direction of the airbag body. The advantage of the invention is, that after the fixation of the airbag to the vehicle structure it can be verified, if the airbag is fixed untwisted by releasing the indication element. If the indication element cannot be released properly it is assumed that the airbag is fixed incorrect. After the incorrect fixation is detected the airbag needs to be detached in a first step and afterwards reattached in a correct position in a second step. The indication element is fixed at the outside of the airbag after the assembling process of the airbag itself, when the airbag is ready for fixation at the vehicle structure. The indication element can be positioned in such that it can be released only when the airbag is attached untwisted at the vehicle.

According to the invention it is further suggested to use a strap as indication element. By using a strap it is possible to use only one indication element for the whole length.

According the invention it is further suggested to use a very easy and cost effective possibility to fix the indication element by using an adhesive. The adhesive can be arranged at the indication element before the fixation, or it can be used a self-adhesive indication element.

In the invention it is further suggested that the airbag can be rolled to form a rolled package with an extending end, wherein the indication element covers the gap to avoid that particles entering in the airbag package.

In one embodiment of the invention one end of the indication element should not be fixed at the air-bag package but stays loose. Therefore the indication element can be easily grasped for releasing.

Furthermore, in accordance with the invention, the end can be designed with a longer length than the airbag body, so that the end is hanging downwards in the mounted condition of the inflatable curtain airbag. By viewing the hanging end it is very easy to detect the not released indication element, and it is further facilitated to grasp the end.

In an embodiment of the invention there is suggested another possibility to simplify the grasping of the indication element by designing the end in a shape of a loop, where the operator can enter his finger or a tool for pulling the indication element.

In another embodiment it is proposed that the indication element should be made in a different colour than the airbag package. Possible colours would be warning colours like red, yellow or orange. Thereby the indication element can be easily identified even under bad light conditions.

Furthermore it is suggested in accordance with the invention to make the indication element of a thin foil, preferably of plastic. By designing the indication element as a thin foil, it is provided a big adhesive and warning surface to assure a good visibility and attachment with a minimum of weight. Furthermore the indication element can cover the gap properly, even when the width or the position of the gap varies along the length of the airbag.

It is further suggested in accordance with the invention to arrange the indication element at the lower side of the airbag body. Arranging the indication element at the lower side enables an easy release movement also when the operator is standing outside the vehicle. The operator needs to pull the end of the indication element just downwards. When the interior trim panel is mounted by mistake without releasing the indication element before, it is possible to lift the interior trim panel a small distance and pull the indication element through the small gap downwards without detaching the whole panel.

In another preferred embodiment it is suggested, that the airbag package is secured by a wrapper or a plurality of strips wound around the package.

The indication element is preferably arranged at the outside of the airbag package secured by the wrapper or strips. The advantage of this proposal is that the indication element can be released without any problems and cannot be fixed unintentionally by a strap.

BRIEF DESCRIPTION OF THE DRAWINGS

The invention is described in the following according to preferred embodiments, wherein it is shown in the figures;

FIG. 3 shows a section of an attached inflatable curtain airbag mounted in a twisted condition.

DETAILED DESCRIPTION OF THE INVENTION

Figure 1:
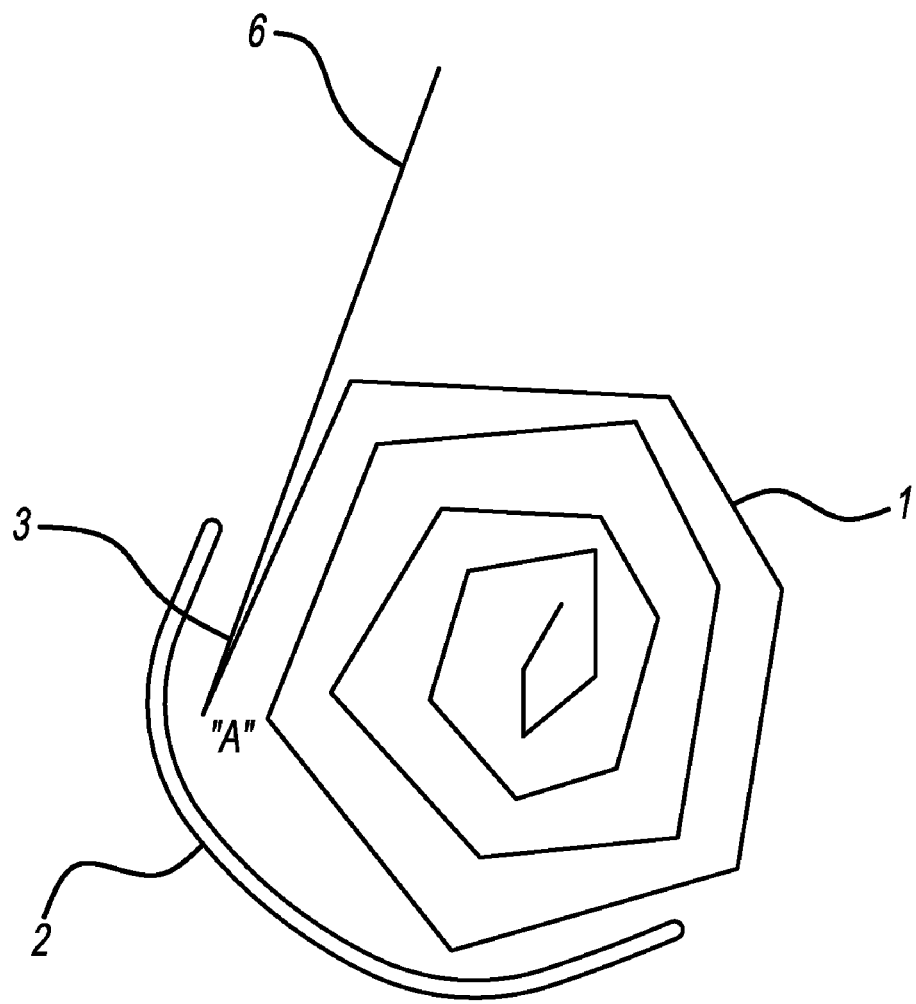
FIG. 1 illustrates an airbag in accordance with this invention rolled with attached indication element in cross section.

In FIG. 1 it is shown an airbag 1 rolled to form an airbag package with an extending end 3. The extending end 3 is folded backwards for providing an attachment portion 6. Between the extending end 3 and the rolled airbag 1 is located a gap A. At the outside of the airbag 1 is fixed an indication element 2 covering the gap A. Therefore the indication element 2 avoids the entering of dirt into the gap. The inflator 4 (shown in FIG. 2) inflates the airbag 1, while the roll is unrolled downwards. The occupant is located in FIG. 1 at the right side of the vehicle, so that so called "outboard" roll as shown unrolls with its open side towards the side window during the inflation. The indication element 2 is arranged at the lower side of the airbag 1 and can be detached by pulling downwards.

Figure 2:
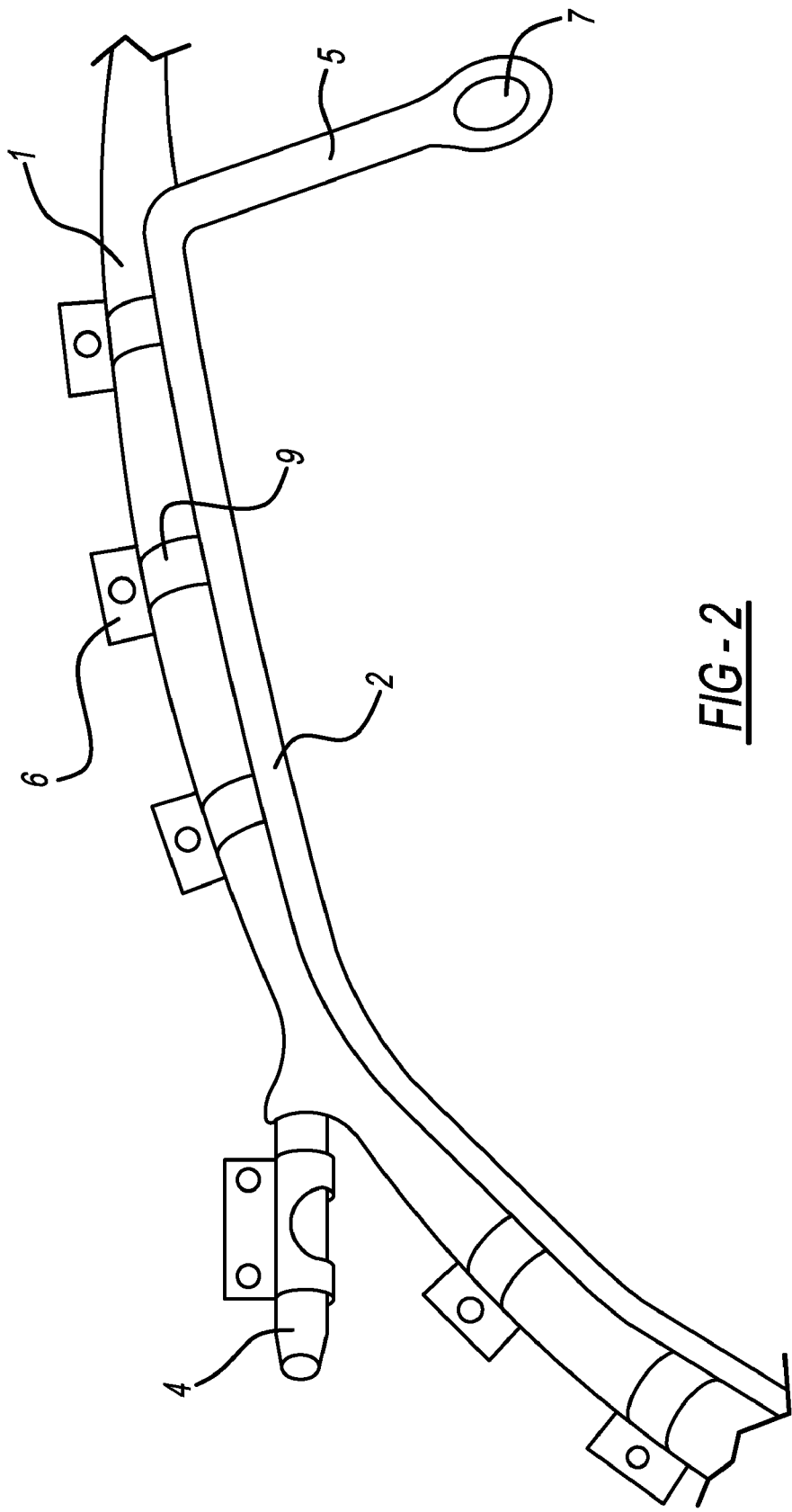
FIG. 2 shows an inflatable curtain airbag with indication element.

In FIG. 2 it is shown an inflatable curtain airbag comprising the airbag 1, the inflator 4 and the indication element 2. The airbag 1 is provided with several attachment portions 6, which can be used for a clip, bolt or screw connection to the vehicle structure. Furthermore strips 9 are associated with each attachment portion 6 in order to secure the rolled condition of the airbag 1. The indication element 2 is designed as a strap extending along the length direction of the airbag. By using a foil as an indication element 2 good visibility and a sufficient adhesive surface is provided with a minimum of weight. The colour of the indication element should be different from the colour of the airbag 1 preferably warning colours should be used for a good visibility. The end 5 of the indication element 2 is hanging downwards, so that it is easy to check whether the indication element 2 is released or not. Furthermore the operator can catch the indication element 2 very easy by the downwards hanging end 5. The end 5 is further provided with a loop 7, so that the operator can engage the indication element very simple with his finger or a tool.

In FIG. 3 it is shown a part 8 of the airbag 1 which is twisted. The indication element 2 is twisted together with the airbag 1. When the airbag 1 would be attached in this condition to the vehicle, it is not possible to deploy the airbag to its full size. Therefore at least a part of the side structure of the vehicle would not be covered, and the occupant would not be protected in this area. After the assembly of the airbag 1 at the vehicle the operator would try to release the indication element 2 in this position. Because of the twisted part it is not possible to detach the indication element 2 in this area, and the operator would immediately recognise the incorrect attachment position because of the disabled detachment.

While the above description constitutes the preferred embodiment of the present invention, it will be appreciated that the invention is susceptible to modification, variation, and change without departing from the proper scope and fair meaning of the accompanying claims.

The invention claimed is:

1. An inflatable curtain airbag for a vehicle comprising:
    an airbag body rolled or folded to form a longitudinal airbag package with several attachment portions; and
    an indication element for indicating a twisted attachment status of the airbag when the airbag is mounted to the vehicle structure,
    the indication element being arranged on the longitudinal rolled or folded airbag body before mounting to the vehicle structure in a releasable manner along at least parts of a longitudinal extension of the airbag body,
    the indication element being detachable upon proper mounting to the vehicle structure and not detachable upon a twisted mounting of the longitudinal airbag package to the vehicle structure.

2. An inflatable curtain airbag according to claim 1 further comprising that the indication element is in the form of a strap.

3. An inflatable curtain airbag according to claim 1, further comprising that the indication element is fixed by an adhesive at the outside of the airbag package.

4. An inflatable curtain airbag according to claim 1 further comprising that the airbag is rolled to form a roll with an extending end including a gap between the roll and the end, wherein the indication element is covering the gap when the airbag is mounted to the vehicle.

5. An inflatable curtain airbag according to claim 1 further comprising that at least one end of the indication element is not fixed at the airbag package.

6. An inflatable curtain airbag according to claim 1 further comprising that the length of the indication element is greater than the length of the airbag package.

7. An Inflatable curtain airbag according to claim 1 further comprising that an end of the indication element is formed in a shape of a loop.

8. An inflatable curtain airbag according to claim 1 further comprising that the indication element has a different color than the airbag body.

9. An inflatable curtain airbag according to claim 1 further comprising that the indication element is made of a thin foil.

10. An inflatable curtain airbag according to claim 1 further comprising that the indication element is arranged at the lower side of the airbag package.

11. An inflatable curtain airbag according to claim 1 further comprising that the airbag package is secured by a wrapper or a plurality of strips wound around the airbag package.

12. An inflatable curtain airbag according to claim 11 further comprising that the indication element is arranged at the outside of the airbag package.

* * * * *